July 7, 1964
D. L. MORGAN ETAL
3,139,897
FLOAT VALVE
Filed Sept. 19, 1962
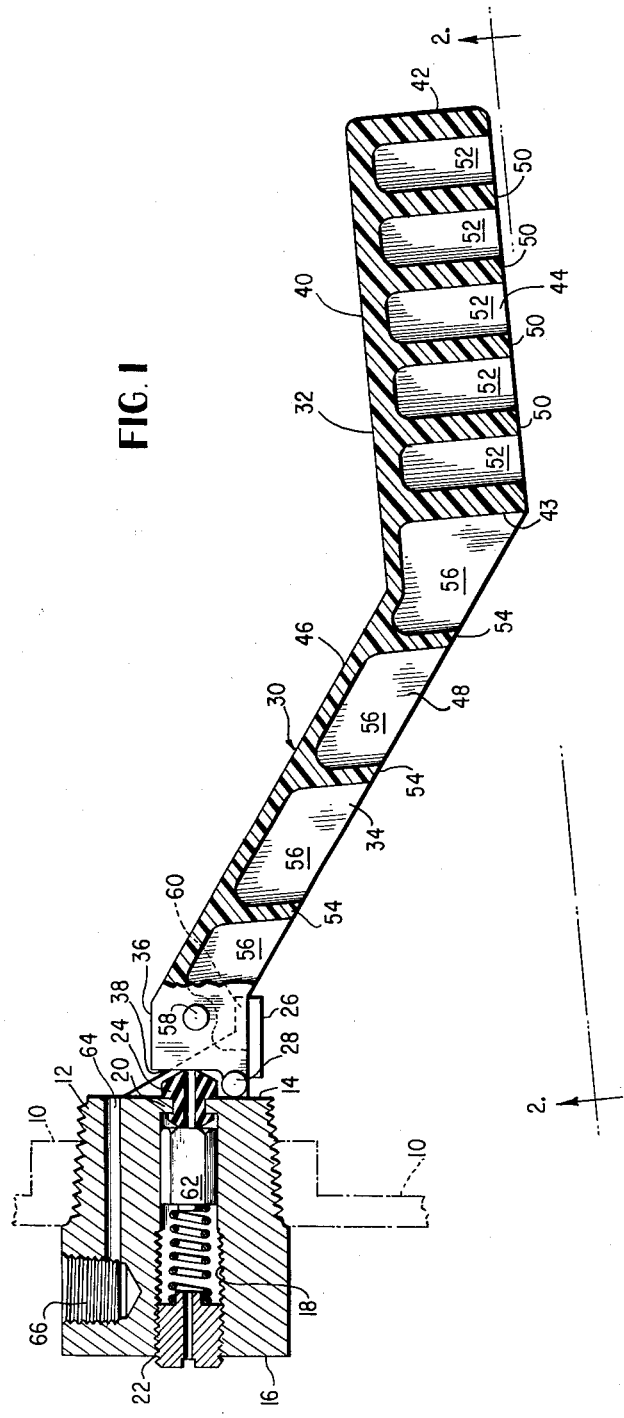
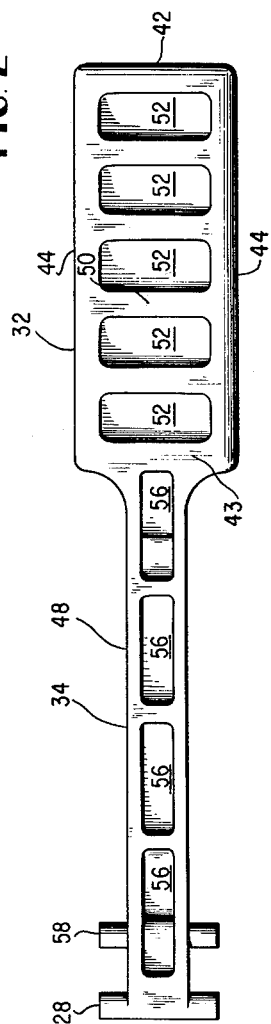
INVENTORS
DAVID LUKE MORGAN
LOUIS ASMUS GODKIN
BY
Browne, Schuyler and Beveridge
ATTORNEYS

3,139,897
FLOAT VALVE

David L. Morgan, Shelton, and Louis A. Godkin, Bethel, Conn., assignors to Robertshaw Controls Company, Richmond, Va., a corporation of Delaware
Filed Sept. 19, 1962, Ser. No. 224,778
2 Claims. (Cl. 137—448)

This invention relates to improvements in liquid level responsive float valves particularly of the type adapted to control the amount of air in an enclosed tank of a water storage system. This invention is an improvement of the invention disclosed in the copending application Serial No. 130,530 of Kenneth G. Kreuter, filed August 10, 1961.

In copending application Serial No. 130,530, an air ejector fitting having a passage for fluid is mounted in the wall of a water storage tank. A resilient grommet is mounted in the inlet of the passage to form a valve seat and a buoyant plastic float is pivotally mounted on the fitting. Fluid flow through the passage is controlled by the rise and fall of the float with varying water levels in the tank. As the water level rises, the float pivots upwardly until a planar valve portion formed in the float seats against the grommet to close the passage and prevent the escape of air from the tank. As water is withdrawn from the tank of the float pivots downwardly and uncovers the aperture in the grommet to open the passage. Reference may be made to that application for a disclosure of a typical system with which the present invention is particularly adapted for use.

An object of this invention is to provide a unitary float valve which is simple in construction and economical to produce.

A further object is to provide a float valve having improved buoyancy characteristics to increase the accuracy of response to variations in liquid level.

The foregoing, and other objects are achieved by the provision of a float valve comprising a unitary, buoyant plastic member having a float element with a lever arm extending therefrom. Formed on the end of the lever arm remote from the float element is a planar valve surface which cooperates, upon pivotal movement of the lever arm, with a valve seat to control flow through a passage. To increase the buoyancy of the float valve, a series of air chambers are formed on the lower side of the float element and lever arm so that as the float and lever rise and fall with variations in the water level, air is entrapped in the air chambers and increases the buoyancy. By providing a series of air chambers, some air is entrapped beneath the float element regardless of the angular position of the float valve about its pivot point.

Other objects and advantages will become apparent from the following description taken in connection with the accompanying drawing in which:

FIG. 1 is a sectional view of the float valve embodying the invention; and FIG. 2 is a bottom plan view taken on line 2—2 of FIG. 1.

Indicated by the phantom lines is the wall of a water storage tank 10 into which is threadedly connected a fitting 12. Fitting 12 has a forward or inner face 14, and a rear or outer face 16. Formed in the fitting is a cylindrical passage 18 having a reduced inlet 20 and an outlet 22. Mounted on the annular shoulder provided by inlet 20 is a resilient grommet 24. The aperture in grommet 24 provides a passage for air from the interior of storage tank 10 through passage 18 and also serves as a resilient valve seat as is described in the previously referred to copending application Serial No. 130,530.

Mounted on fitting 12 adjacent the inner face 14 is a pair of bracket elements 26. Bracket elements 26 are mounted one on each side of grommet 24 and are joined to fitting 12 by means of welding, brazing or other conventional means.

Pivotally mounted on brackets 26 is a float valve 30 comprising a unitary piece of molded plastic having a density less than that of water and may, for example, be of polyethylene which has a density of about .92. Float valve 30 comprises a float element 32 which projects from one end of a lever arm 34.

Formed on one end of the lever arm opposite the enlarged float element 32 is a mounting element 36 which, in the preferred form, is angularly disposed with respect to the longitudinal axis of lever arm 34. For controlling flow through passage 18 from the interior of the tank, a planar valve face 38 is defined on the end of mounting element 36 so that as the float valve pivots counter-clockwise in FIG. 1, valve face 38 seats against grommet 24 and shuts off fluid flow through the passage.

Float element 32 is formed with a top wall 40, a front end wall 42, and a rear end wall 43. Front wall 42 and rear wall 43 each depend from the top wall and are connected by a pair of spaced side walls 44 depending from the side edges of the top wall. Lever arm 34 also is formed with a top wall 46 and a pair of spaced depending side walls 48.

A series of integral transverse ribs 50 extend between side walls 44 and depend from top wall 40 to define a plurality of air chambers 52 open on the lower side of float element 32. Similarly, a series of integrally formed transverse ribs 54 cooperate with side walls 48 of lever arm 34 to define a series of air chambers 56.

Projecting laterally from each side of mounting element 36 is a stop pin 58 which cooperates with a shoulder 60 formed on bracket members 26 to limit the downward pivotal movement of the float element with respect to grommet 24.

Fitting 12 may also be provided with a spring loaded release valve 62 for releasing excess air from tank 10 when float valve 30 is pivoted downwardly to open passage 18. A pressure gage may be mounted on the fitting for measuring the tank pressure through a taped hole 66 which communicates with a passage 64 formed in the fitting.

When the water level in tank 10 is low, float valve 30 pivots downwardly about pins 28 which are mounted in cooperating slots or apertures in brackets 26 until pins 58 abut shoulder 60. In this position valve face 38 is out of engagement with grommet 24 and the tank is in communication with passage 18 through the aperture in grommet 24. As the water level rises, float valve 30 moves upwardly and the water entraps air in chambers 52 and 56 increasing the buoyancy. Float element 32 moves upwardly until valve face 38 is positioned transversely across the aperture of grommet 24 preventing the further escape of air from tank 10. By providing multiple chambers rather than a single chamber, the amount of air lost as the float arm tilts from the horizontal position is minimized.

While a specific form of the invention has been illustrated and described, it will be apparent that the invention is not limited to the precise construction shown. Various modifications can be made without departing from the scope of the invention which is defined in the appended claims.

What is claimed is:

1. A liquid level responsive valve comprising;
    a buoyant plastic lever;
    a buoyant plastic float element formed on one end of the lever and projecting at an angle from the end of the lever;
        said lever and float element each having a top wall and a pair of spaced depending side walls;
    a series of transverse ribs connecting the side walls to define a plurality of air chambers on the lower side of the lever and float element;
and a planar valve face on the end of the lever remote from the float element.

2. A liquid level responsive valve comprising;
a buoyant, plastic lever,
a buoyant, plastic float element formed on one end of the lever,
   said lever and float element having a top wall and pair of spaced depending side walls,
a series of transverse ribs connecting the side walls defining a plurality of air chambers on the lower side of the lever and float element.

References Cited in the file of this patent

UNITED STATES PATENTS

| | | |
|---|---|---|
| 659,819 | Lockwood | Oct. 16, 1900 |
| 2,551,792 | DeGiers | May 8, 1951 |
| 2,646,067 | Smith | July 21, 1953 |
| 2,812,772 | Moore | Nov. 12, 1957 |

FOREIGN PATENTS

| | | |
|---|---|---|
| 121,770 | Great Britain | Jan. 9, 1919 |
| 373,476 | Great Britain | May 26, 1932 |
| 560,771 | Italy | Apr. 10, 1957 |